H. T. NEWBIGIN.
THRUST AND LIKE BEARING.
APPLICATION FILED DEC. 3, 1915.

1,205,923.

Patented Nov. 21, 1916.

Witnesses:

Inventor
Henry T. Newbigin

UNITED STATES PATENT OFFICE.

HENRY T. NEWBIGIN, OF NEWCASTLE-UPON-TYNE, ENGLAND.

THRUST AND LIKE BEARING.

1,205,923.  Specification of Letters Patent.  Patented Nov. 21, 1916.

Application filed December 3, 1915. Serial No. 64,932.

*To all whom it may concern:*

Be it known that I, HENRY THORNTON NEWBIGIN, a subject of the King of Great Britain, residing in Newcastle-upon-Tyne, England, have invented certain new and useful Improvements in Thrust and like Bearings, of which the following is a specification.

Thrust bearings in which one of the bearing surfaces is subdivided into segments pivoted at their backs for the purpose of facilitating the entrance of the lubricant between the rubbing surfaces are well known. One form of such bearing is, for example, described in the specification of the British Patent No. 875 of 1905. For the purpose of insuring substantially equal distribution of the load among the segments in such an arrangement it has been proposed to support each of the segments on an independently adjustable set screw or the like, which may extend through the carrying member of the bearing.

It has been customary to space the segments around the shaft so that they encircle it completely, and this has necessitated the construction of the carrying member in halves jointed on a plane passing through the axis of the shaft, when the general arrangement is such that the shaft is dropped into its bearings.

I have found that it suffices for efficient operation of the thrust bearing if the segments do not entirely encircle the shaft, provided they extend over an arc larger than a semi-circle. This simplifies the construction considerably since it becomes possible to make the carrying member in one part only and of such form that the shaft can be lowered or otherwise deposited into place. Thus when the shaft is to be mounted or dismounted, the trouble of having to manipulate a heavy upper half of the carrying member is avoided. By the invention, therefore, the carrying member is made of sufficient depth to receive set screws above the horizontal axial plane of the shaft, and of such a form that these set screws can be carried without interfering with the lowering of the shaft into place. For example, assuming that there are six set screws, the above conditions may be fulfilled if the screws are spaced 45° apart, the lowest two being spaced each 22.5° on each side of the vertical axial plane. In the known construction, six set screws would have been spaced 60° apart, necessitating a carrying member made in two parts as already stated.

The invention will be fully described with reference to the accompanying drawing, in which one form of bearing constructed according to the invention is illustrated by way of example.

Figure 1:
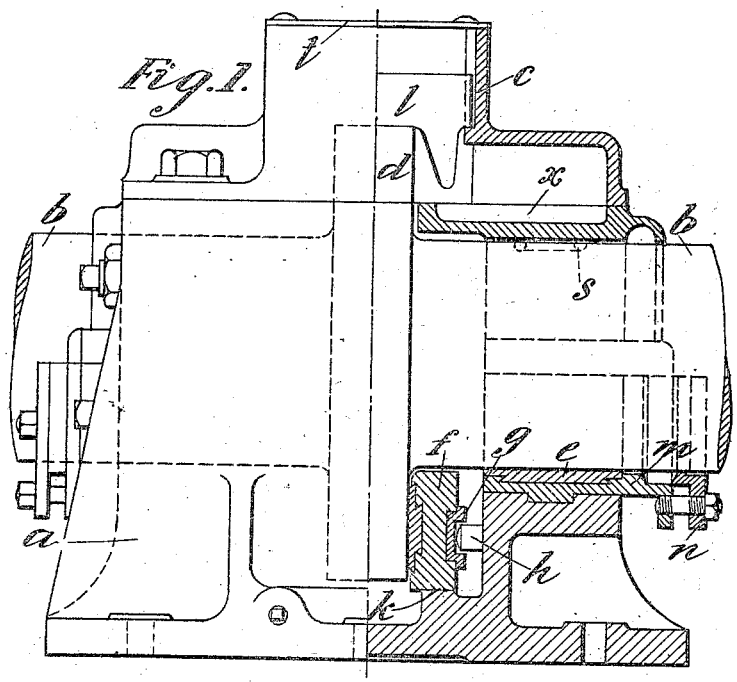
Figure 2:
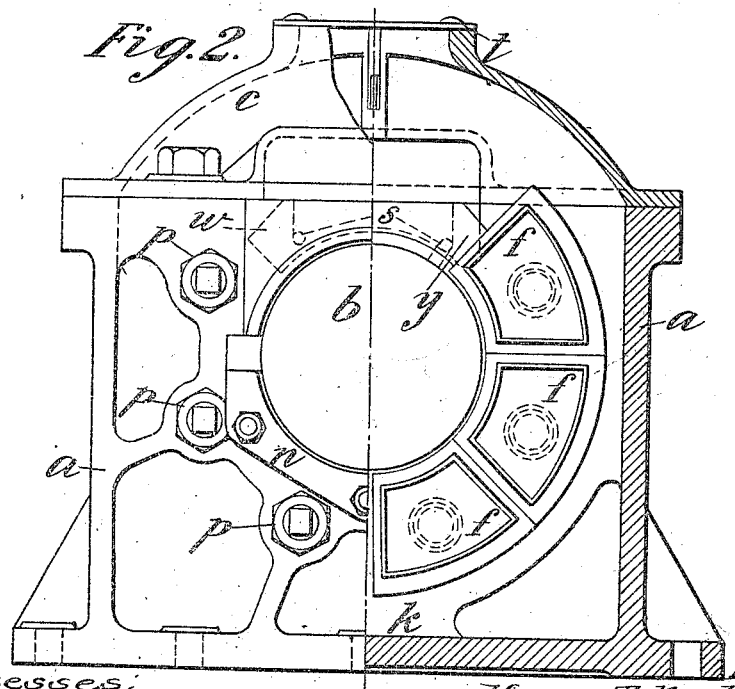

Figure 1 is a longitudinal sectional elevation through the bearing. Fig. 2 is a transverse sectional elevation through the bearing.

The shaft $b$ having the collar $d$ is supported in two journal bearings formed in the carrying member $a$. These journal bearings may be lined with white metal $e$ in a semicircular liner $m$ which may be continued outwardly beyond the bearing to form a stuffing box fitted with the gland $n$ to prevent the escape of oil; or any other method of supporting the shaft in the journal bearings may be employed. In general, a bottom liner alone is necessary, but a top liner may also be employed where this is desired. Where a top liner is not employed, or even in some cases where it is, the upper portion of the journal bearings may as shown be fitted with top brasses $w$, of which the top may be made hollow to form an oil well $x$, which extends in the direction of the collar $d$ for the purpose hereinafter described.

The thrust from either side of the collar $d$ is taken by one or other of two series of blocks $f$ mounted in the carrying member on either side of the collar. Each of the blocks $f$ is supported on the end $h$ of screws or pins $p$ passing through holes tapped or formed in the frame of the carrying member $a$. Hardened steel cups $g$ may be fitted in the blocks $f$ to receive the ends $h$ of the screws $p$. These ends $h$ are in known manner preferably made round or spherical to permit the blocks $f$ to pivot or turn on them. The outer edges of the blocks may rest on a ledge $k$.

The blocks $f$ may be pivoted at or near their center as shown, or they may be pivoted nearer their ends, or at any other point which may be most convenient according to circumstances. In some cases also it is advantageous to pivot them alternately behind and in front of their centers. They may also all be of the same size as shown, or they may be of different sizes, and any convenient number may be employed to take the thrust in either direction.

In the arrangement shown, six blocks are employed the centers of which are spaced 45° apart, the lowest two being so arranged that their centers are each spaced 22.5° on either side of the vertical plane passing through the axis of the shaft. From this it follows that the centers of both the upper two blocks will be spaced at an angle 22.5°, above the plane passing horizontally through the axis of the shaft. To permit of this being done without forming the carrying member $a$ in two parts, the carrying member is extended upward at both sides above the horizontal axial plane so as to carry pins or set screws $p$, which while adapted to support the two top blocks $f$ above this plane can yet be spaced so far apart as to allow the shaft $b$ to be lowered into the bearing without interfering with it.

The carrying member $a$ is preferably covered by a relatively light cover $c$, which may be fitted with a smaller inspection door $t$, and the carrying member is preferably carried up to such a height above the shaft as shown, that the cover $c$ can rest flat upon it. To provide for lubrication, the interior of the carrying member $a$ may be filled with oil up to about the lower surface of the shaft, thereby submerging the lower of the blocks $f$. Lubrication of the journal bearings and the blocks $f$ above the oil level may be provided by the scraper $l$ attached to the door $t$, or resting in slots in the cover $c$ which engages the periphery of the collar $d$ and removes oil raised, thereby directing it into the oil well $x$, from which it is supplied to both the journal and thrust portions of the bearings through holes $s$. The projecting end of the oil well $x$ toward the collar $d$ may enter between the two top blocks $f$ and forms a stop $y$, to oppose any tendency of the blocks $f$ to rotate with the collar $d$.

Having thus described the said invention and the best means I know of carrying the same into practical effect, I claim:—

1. A thrust bearing having a fixed bearing surface formed of separately pivoted segments arranged to admit a shaft in a direction normal to the axis, the segments embracing or surrounding more than half the shaft, and a single member carrying all of the segments.

2. A thrust and journal bearing comprising a single main carrying member, a journal bearing therein to carry a shaft, and separately pivoted blocks mounted therein or thereon and adapted to extend at both sides beyond or above a plane passing through the axis of the shaft so as to admit the shaft in a direction normal to its axis.

3. A thrust bearing having a fixed bearing surface comprising a plurality of separately pivoted segments adapted to embrace a shaft for more than 180°, and a single carrying member to support or carry said pivoted segments formed with an opening at one part for the passage of the shaft.

4. A thrust bearing having a fixed bearing surface comprising a plurality of separately pivoted segments adapted to embrace a shaft for more than 180°, and a single approximately U-shaped carrying member to support or carry said pivoted segments, the sides of which form an opening for the passage of the shaft, and when the latter is in position extend above or beyond a plane passing through its axis.

5. A thrust bearing having a fixed bearing surface comprising a plurality of separately pivoted segments adapted to embrace a shaft for more than 180°, a single approximately U-shaped carrying member, and a series of pins or studs upon the carrying member to support or carry said pivoted segments, the upper or extreme pins or studs being above or beyond the plane of the axis of the shaft, but spaced apart sufficiently to allow the shaft to pass or be lowered into position between them.

6. In a thrust bearing for a shaft having a thrust collar, a fixed bearing comprising a plurality of separately pivoted segments adapted to embrace a shaft for more than 180°, a single carrying member to support or carry said pivoted segments formed with an opening at one part for the passage of the shaft, an oil well, in which the lower portion of the thrust collar rotates, means in the upper part of the bearing for scraping or collecting oil from the upper part of the collar as it rotates, and means for directing such oil onto the thrust bearing segments.

7. In a combined thrust and journal bearing for a shaft having a thrust collar, a fixed bearing comprising a plurality of separately pivoted segments embracing the shaft for more than 180°, a single carrying member to support or carry said pivoted segments formed with an opening at one part for the passage of the shaft, an oil well in which the lower portion of the thrust collar rotates, means in the upper part of the bearing for scraping or collecting oil from the upper part of the collar as it rotates, and means for directing such oil onto the thrust bearing segments and to the journal bearing.

8. In a thrust bearing for a shaft having a thrust collar, a fixed bearing comprising a plurality of separately pivoted segments adapted to embrace the shaft for more than 180°, a single carrying member to support or carry said pivoted segments formed with an opening at one part for the passage of the shaft, an oil well in which the lower portion of the thrust collar rotates, means in the upper part of the bearing for scraping or collecting oil from the upper part of the collar as it rotates, and an oil cup adapted to receive and distribute the oil collected from the thrust collar on the shaft.

In testimony whereof I have signed my name to this specification in the presence of two subscribing witnesses.

HENRY T. NEWBIGIN.

Witnesses:
THOMAS BOWMAN RICHARDSON,
ROBERT JOHNSTON.